United States Patent
Gallagher et al.

(10) Patent No.: US 11,490,177 B1
(45) Date of Patent: Nov. 1, 2022

(54) OPTICAL LINK SYSTEM AND METHOD FOR COMPUTATION

(71) Applicant: Luminous Computing, Inc., Menlo Park, CA (US)

(72) Inventors: Patrick Gallagher, Menlo Park, CA (US); Thomas W. Baehr-Jones, Menlo Park, CA (US); Michael Gao, Menlo Park, CA (US); Mitchell A. Nahmias, Menlo Park, CA (US)

(73) Assignee: Luminous Computing, Inc., Menlo Park, CA (US)

( * ) Notice: Subject to any disclaimer, the term of this patent is extended or adjusted under 35 U.S.C. 154(b) by 0 days.

(21) Appl. No.: 17/337,289

(22) Filed: Jun. 2, 2021

Related U.S. Application Data

(60) Provisional application No. 63/187,812, filed on May 12, 2021, provisional application No. 63/035,667, filed on Jun. 5, 2020.

(51) Int. Cl.
*H04J 14/00* (2006.01)
*H04Q 11/00* (2006.01)
*H04B 10/25* (2013.01)

(52) U.S. Cl.
CPC ......... *H04Q 11/0005* (2013.01); *H04B 10/25* (2013.01)

(58) Field of Classification Search
CPC ........ H04B 10/801; H04B 10/25; G02B 6/43; H04Q 11/0005; H04Q 2011/009; H04Q 11/0062
See application file for complete search history.

(56) References Cited

U.S. PATENT DOCUMENTS

| | | |
|---|---|---|
| 6,363,183 B1 | 3/2002 | Koh |
| 6,690,845 B1 | 2/2004 | Yoshimura et al. |
| 8,372,726 B2 | 2/2013 | De Graff et al. |
| 8,536,667 B2 | 9/2013 | Arora et al. |
| 11,079,548 B2 | 8/2021 | Chang et al. |
| 2002/0028045 A1 | 3/2002 | Yoshimura et al. |
| 2002/0039464 A1 | 4/2002 | Yoshimura et al. |
| 2002/0097962 A1 | 7/2002 | Yoshimura et al. |

(Continued)

FOREIGN PATENT DOCUMENTS

WO 2022029939 A1 2/2022

OTHER PUBLICATIONS

"NVSwitch—Nvidia", Wikichip, Chips & Semi, https://en.wikichip.org/wiki/nvidia/nvswitch, Mar. 27, 2018.

(Continued)

*Primary Examiner* — Pranesh K Barua
(74) *Attorney, Agent, or Firm* — Jeffrey Schox; Samuel Rosenthal

(57) ABSTRACT

An optical link system for computation, preferably including a photonics substrate and a plurality of electronics modules, such as processors, memory controllers, and/or switches, which are preferably bonded to the photonics substrate. A photonics substrate, preferably including a plurality of optical links including waveguides and optical transducers. A method for optical link system operation, preferably including operating electronics modules and using optical links, optionally in cooperation with electronics modules such as switches, to transfer information between the electronics modules.

14 Claims, 8 Drawing Sheets

(56) References Cited

U.S. PATENT DOCUMENTS

| | | |
|---|---|---|
| 2004/0126053 A1* | 7/2004 | Ouchi ............... G02B 6/12004 385/14 |
| 2007/0075443 A1 | 4/2007 | Cunningham et al. |
| 2007/0075444 A1 | 4/2007 | Zheng et al. |
| 2013/0209026 A1 | 8/2013 | Doany et al. |
| 2013/0230274 A1 | 9/2013 | Fish |
| 2014/0044391 A1 | 2/2014 | Iizuka et al. |
| 2014/0334768 A1 | 11/2014 | Chang et al. |
| 2015/0211960 A1 | 7/2015 | Shimizu |
| 2015/0333831 A1* | 11/2015 | Lai ........................ G02B 6/428 250/208.2 |
| 2016/0062063 A1 | 3/2016 | Ogura et al. |
| 2016/0109655 A1 | 4/2016 | Vurgaftman et al. |
| 2016/0359568 A1 | 12/2016 | De et al. |
| 2016/0366498 A1* | 12/2016 | Robinson ............ G02B 6/3596 |
| 2017/0366884 A1* | 12/2017 | Rickman ............. H04L 49/1515 |
| 2018/0246279 A1 | 8/2018 | Florian Lohse et al. |
| 2018/0335365 A1 | 11/2018 | Kamei et al. |
| 2019/0025505 A1 | 1/2019 | Kraft et al. |
| 2019/0170945 A1 | 6/2019 | Fortusini et al. |
| 2019/0331941 A1 | 10/2019 | Coolbaugh et al. |
| 2020/0091124 A1 | 3/2020 | Liao et al. |
| 2020/0200987 A1 | 6/2020 | Kim et al. |
| 2021/0124107 A1 | 4/2021 | Meade et al. |
| 2021/0203126 A1 | 7/2021 | Parker |
| 2021/0373236 A1 | 12/2021 | Jiang et al. |

OTHER PUBLICATIONS

Petrini, Fabrizio, et al., "Communication Performance of Wormhole Interconnection Networks", https://www.researchgate.net/publication/2574082_Communication_Performance_of_Wormhole_Interconnection_Networks, Apr. 2001.

Shacham, Assaf, et al., "Maximizing GFLOPS-per-Watt: High-Bandwidth, Low Power Photonic On-Chip Networks", http://www.cs.columbia.edu/~luca/research/pnocs_PAC07.pdf, 2006.

Zhao, Huasha, et al., "Sparse Allreduce: Efficient Scalable Communication for Power-Law Data", arXiv:1312.3020v1 [cs.DC] Dec. 11, 2013.

Song, Weiwei, et al., "High-density waveguide superlattices with low crosstalk", Nature Communications, May 11, 2015.

Dai, Daoxin, et al., "Mode conversion in tapered submicron silicon ridge optical waveguides", Optics Express, vol. 20, No. 12, Jun. 4, 2012.

* cited by examiner

OPTICAL LINK SYSTEM AND METHOD FOR COMPUTATION

CROSS-REFERENCE TO RELATED APPLICATIONS

This application claims the benefit of U.S. Provisional Application Ser. No. 63/035,667, filed on 5 Jun. 2020, and of U.S. Provisional Application Ser. No. 63/187,812, filed on 12 May 2021, each of which is incorporated in its entirety by this reference.

TECHNICAL FIELD

This invention relates generally to the computing field, and more specifically to a new and useful optical link system and method for computation.

BACKGROUND

Typical computing approaches rely on relatively slow, low-bandwidth, high-latency, and/or energy-inefficient communication links (e.g., electrical communication links), limiting their performance and the performance of the computing systems in which they operate. Thus, there is a need in the computing field to create a new and useful optical link system and method for computation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System.

Figure 1A:
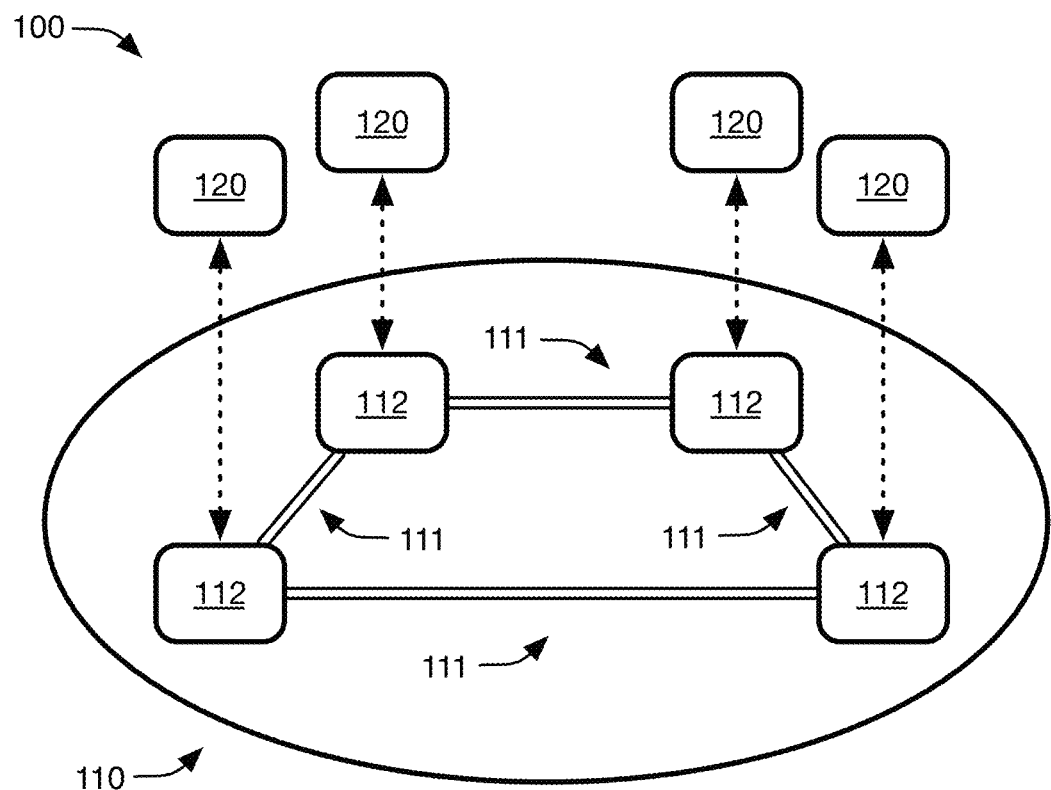
FIG. 1A is a schematic representation of a first embodiment of the system.
Figure 1B:
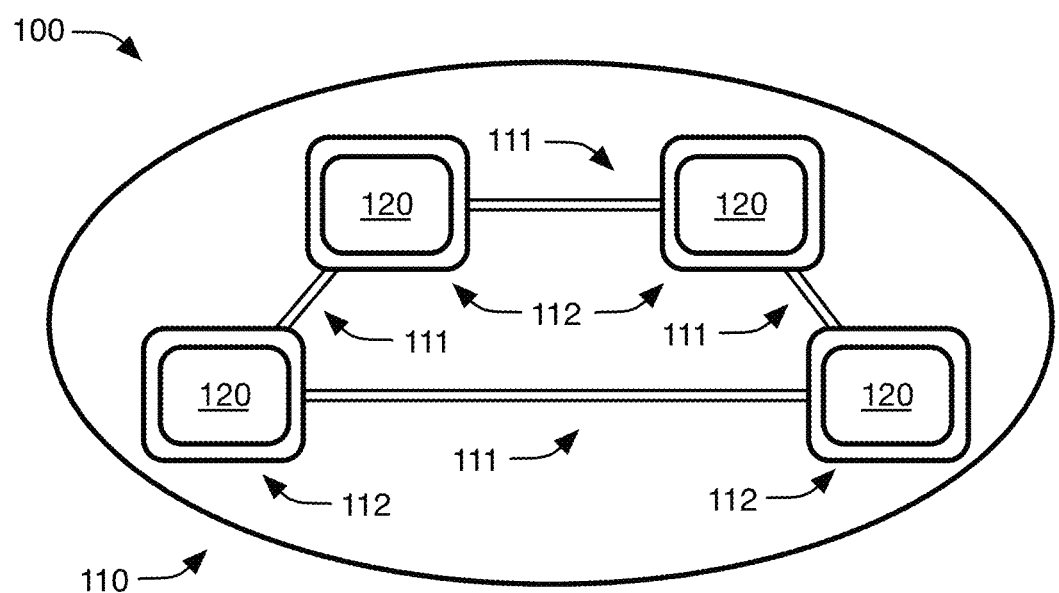
FIG. 1B is a schematic representation of an example of the first embodiment.
Figure 2A:
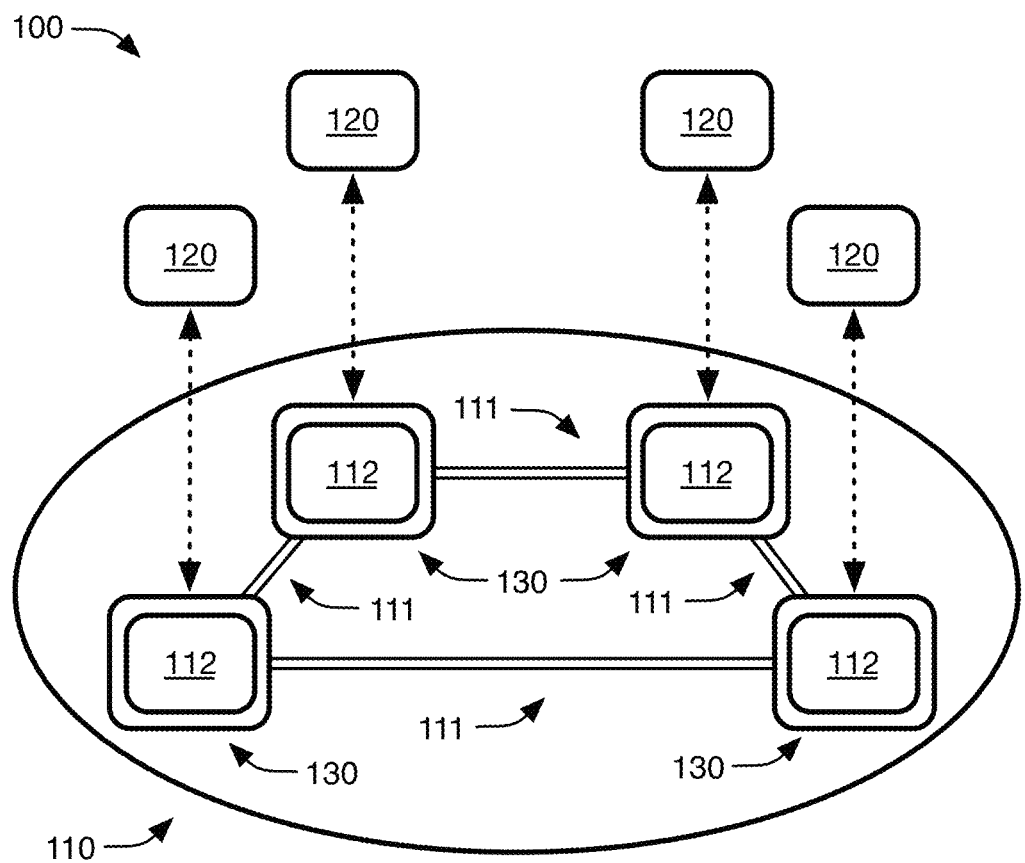
FIG. 2A is a schematic representation of a second embodiment of the system.
Figure 2B:
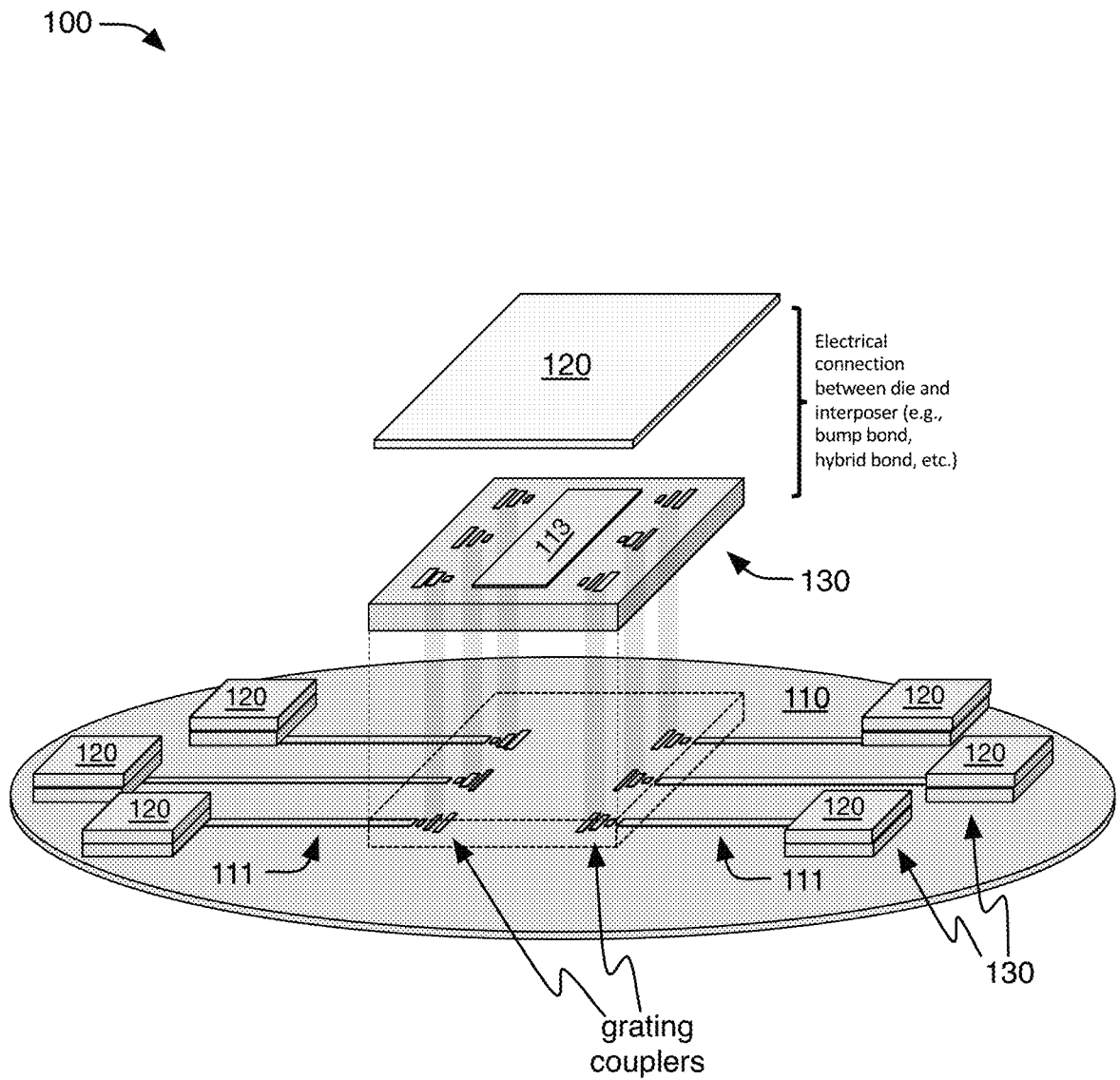
FIG. 2B is an exploded perspective view of an example of the second embodiment.

An optical link system 100 preferably includes a photonics substrate 110 and a plurality of electronics modules 120 (e.g., as shown in FIGS. 1A-1B). The photonics substrate 110 preferably includes a plurality of waveguides in and optical transducers 112, and can optionally include control circuitry 113 and/or any other suitable elements. The electronics modules 120 can include processors 120a, memory controllers 120b, switches 120c, and/or any other suitable electronics modules. The system 100 can optionally include one or more photonic interposers 130 (e.g., as shown in FIGS. 2A-2B). However, the system 100 can additionally or alternatively include any other suitable elements in any suitable arrangement.

1.1 Photonics Substrate.

The photonics substrate 110 preferably functions to optically couple a plurality of electronics modules mounted to the photonics substrate. The photonics substrate 110 preferably includes one or more waveguides 111 and can include one or more optoelectronic transducers 112.

The waveguides 111 preferably function to optically link transducers 112 arranged in various locations across the substrate (e.g., and thereby to communicatively couple electronics modules associated with those transducers). The waveguides can include (e.g., be made of) silicon, silicon compounds (e.g., nitrides, oxides, etc.), one or more polymer materials, and/or any other suitable waveguide material(s). The collection of waveguides are preferably high bandwidth (e.g., due to the use of many waveguides, possibly including parallel waveguides; due to the use of many optical channels, such as wavelength-division multiplexed channels, in each waveguide; etc.). The waveguides can enable low-latency (e.g., light speed or substantially light speed) information transfer across the wafer. They can define any suitable network topology with respect to the electronics modules 120 that they link (e.g., as described in more detail in section 1.4).

The photonics substrate 110 can include optoelectronic transducers 112 of one or more types. These types preferably include detectors 112a and modulators 12b, and can additionally or alternatively include emitters 112c and/or any other suitable transducer types. The detectors 112a preferably function to detect light signals (e.g., received from the waveguides) and transduce them into electronic signals. The modulators 112b preferably function to encode optical signals (e.g., in light traveling through the waveguides) based on electronic signals (e.g., encoding the signal received electrically as the optical signal). The emitters 112c can function to emit light of one or more wavelengths and/or other optical channels (e.g., emit into the waveguides). However, the waveguides can additionally or alternatively receive light emitted by other elements, such as lasers mounted to the substrate or optically coupled to the substrate, such as via fiber optics.

The photonics substrate can optionally include electronic control circuitry (e.g., for controlling operation of one or more transducers 112). The electronic control circuitry is preferably defined on the substrate (e.g., as an integrated circuit or portion thereof), but can additionally or alternatively be defined on the electronics modules 120, photonic interposers 130, and/or can be included in the system in any other suitable manner.

In alternate embodiments, the optoelectronic transducers 112 can additionally or alternatively be present on some or all of the electronics modules 120, photonic interposers 130, and/or any other suitable elements of the system. In such embodiments, the photonic wafer preferably optically couples between the waveguides 111 and the off-substrate optoelectronic transducers 112. For each off-substrate transducer, the photonics substrate can include a grating coupler directing light out-of-plane from a waveguide (and reciprocally into the waveguide from out-of-plane), preferably directing the light toward a complementary grating coupler on the attached element (e.g., electronics module, photonic interposer, etc.) such that the complementary grating coupler can couple light between the waveguide and the off-substrate transducer (e.g., from the waveguide into the transducer and/or from the transducer into the waveguide).

However, the photonics substrate can additionally or alternatively include any other suitable elements in any suitable arrangement.

1.2 Electronics Modules.

The electronics modules 120 preferably function to perform electronic computational tasks. Each electronics module preferably includes a separate die (e.g., wherein the electronic functionality is enabled by one or more integrated circuits defined on the die). The die is preferably bonded to the photonics substrate (or to an interposer, such as a photonic interposer 130). For example, each electronics module can be included on (or as) a separate chip or chiplet.

The electronics module is preferably electrically coupled to the photonics substrate, more preferably to one or more optical transducers arranged proximal to the electronics module (e.g., under the electronics module, such as in the region of the photonics substrate to which the electronics module is bonded; next to the electronics module, such as to the side of the region to which the electronics module is bonded; etc.), such as shown by way of example in FIG. 1B. The electronics module can be bonded by bump bonding, hybrid bonding, and/or any other suitable bonding techniques.

In alternative embodiments, the electronics module can be electrically coupled to a photonic interposer 130, such as a photonic interposer arranged between the electronics module and the substrate (e.g., wherein the photonic interposer and electronics module are bonded to the substrate in a stack), such as described below (e.g., regarding section 1.3) in more detail and/or as shown by way of examples in FIGS. 2A-2B.

The system can include a variety of electronics modules of the same and/or different types, such as processors 120a, memory controllers 120b, switches 120c, and/or any other suitable electronics modules.

Each processor 120a preferably functions to perform computer processing operations. A processor can include one or more generic processing cores (e.g., CPU cores), vector operation cores, matrix multiplication cores (e.g., GEMM cores), and/or processor elements configured to perform any other suitable computing operations in any suitable manner.

Each memory controller 120b preferably functions to control the flow of data to and/or from system memory (e.g., facilitating memory read and/or write operations). The memory controller is preferably communicatively connected to on- and/or off-chip memory, more preferably connected electrically, but additionally or alternatively connected optically and/or in any other suitable manner. In some examples, such as examples including on-chip memory, the memory can be high bandwidth memory (HBM), optionally including processing-in-memory. In some examples, such as examples including off-chip memory, the memory can be connected to one or more PCBs (e.g., connected to a single PCB; connected to one or more DIMMs, such as DIMMs connected to one or more other PCBs; etc.). However, the system can additionally or alternatively include any other suitable memory controllers 120b, and/or the memory controllers can additionally or alternatively interface with any other suitable memory elements.

The system can optionally include one or more switches 120c, which can function to route data between other electronics modules of the system, such as between different processors, between different memory controllers, between processors and memory controllers, and/or between any other electronics modules. The switches can route data between the modules alone (e.g., wherein data is routed through only one switch along a path between a source electronics module and a destination electronics module, wherein a switch controls routing of data it receives irrespective of operation of other switches of the system, etc.) and/or in cooperation with other switches of the system. Each switch is preferably a packet-switching router (but can additionally or alternatively perform circuit-based switching and/or any other suitable switching). Such switches 120c can enable a significant increase in network flexibility as compared with a switchless architecture. The switched architectures can have benefits for collective operations (e.g., All-Reduce, All-Gather, All-Scatter, etc.), and/or can offer any other suitable benefits. Additionally or alternatively, some or all of the switches 120c may function to perform any other suitable operations, such as reduce, gather, and/or scatter operations.

The switches preferably perform switching electronically. However, one or more switches can additionally or alternatively perform optical switching, and accordingly, may be considered a photonics module rather than an electronics module. A person of skill in the art will recognize that an optical switch can be coupled to the photonics substrate in an analogous manner as the electronics modules 120, except that the communicative couplings between the optical switch and the photonics module may be purely optical (e.g., not be intermediated by an optoelectronic transducer).

However, the system can additionally or alternatively include any other suitable electronics modules having any other suitable functionalities.

1.3 Photonic Interposers.

In some embodiments, the system may include one or more photonic interposers (e.g., as shown in FIGS. 2A-2B). Each photonic interposer is preferably arranged between a different electronics module and the photonics substrate.

The interposer can function to couple the electronics module to the substrate. For example, it can mechanically couple the electronics module to the substrate by being bonded together with the electronics module to the substrate.

Further, it can communicatively couple the electronics module to the substrate. The photonic interposer is preferably optically coupled to the substrate, wherein light is coupled (e.g., by gratings, such as described above) between the interposer and one or more waveguides of the substrate. The interposer is preferably electrically coupled to the electronics module (e.g., via bonding, such as bump bonds, hybrid bonds, etc.). The interposer preferably transduces signals between the optical and electrical domains to enable communicative coupling of the electronics module and the photonics substrate via the photonic interposer, wherein the interposer can include one or more optoelectronic transducers (e.g., as described above regarding the optoelectronic electronic transducers 112).

However, the, the photonic interposers 130 can additionally or alternatively include any other suitable elements and/or have any other suitable arrangement within the system. Further, the system 100 can additionally or alternatively include any other suitable elements.

1.4 Network Topology.

The network (e.g., photonic network) communicatively coupling the electronics modules (e.g., defined by the waveguides 111, optionally in cooperation with the switches 120c) can define a variety of topologies. For example, these topologies can be represented as graphs and/or multigraphs (which can be directed or undirected) of electronics modules (nodes) and communicative connections between them (edges), such as communicative connections formed by waveguides that optically couple transducers associated with the nodes.

In a first embodiment, the communication paths between the processors and memory controllers are preferably intermediated by one or more switches. This embodiment preferably includes no direct waveguide connections between the processors and memory controllers, and more preferably also includes no direct waveguide connections between different processors or between different memory controllers (but can alternatively include some direct waveguide connections between non-switch electronics modules). Accordingly, this embodiment can be described as the combination of a processor topology (e.g., subgraph with all edges that have a processor as an endpoint, such as the induced subgraph of the processors and switches) and a memory topology (e.g., subgraph with all edges that have a memory controller as an endpoint, such as the induced subgraph of the memory controllers and switches).

Figure 3A:
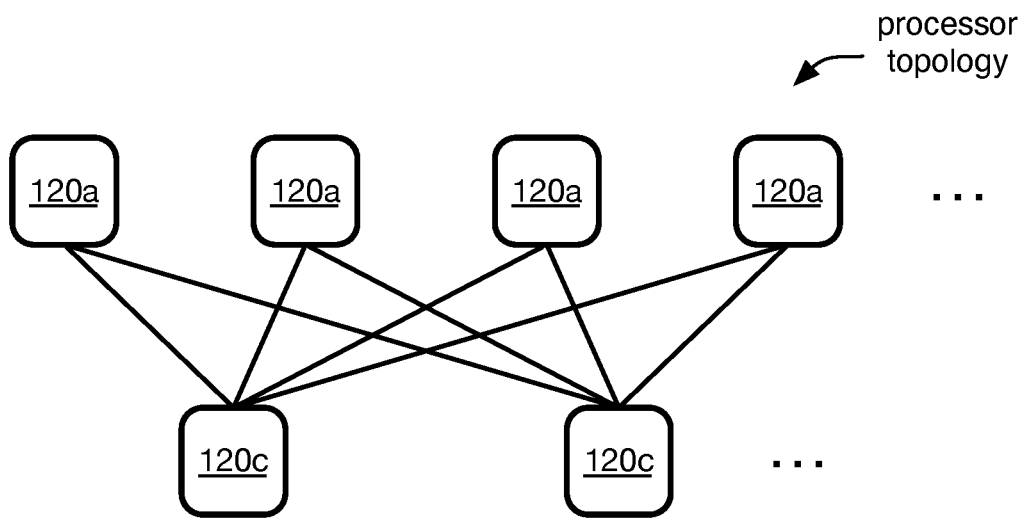
FIG. 3A is a schematic representation of a first variation of a switched processor topology.
Figure 3B:
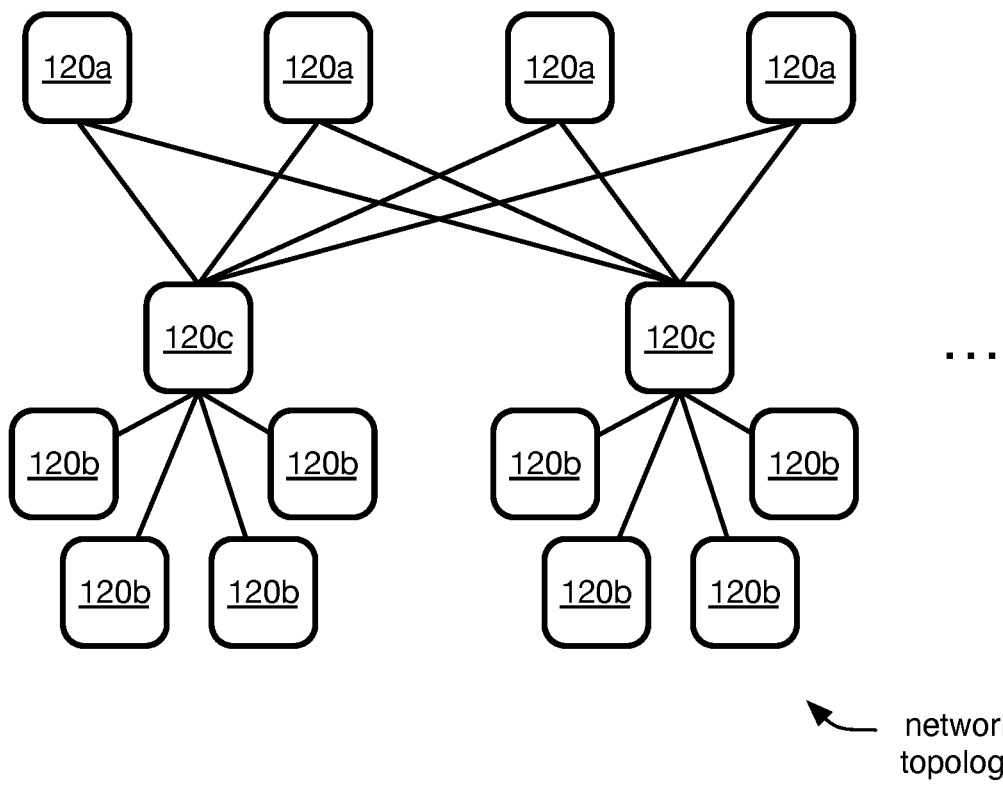
FIG. 3B is a schematic representation of an example of a switched network topology.

In a first variation of this embodiment, the processor topology defines a complete bipartite graph (bigraph) between the processors and switches, wherein all processors of the system define the first part of the bigraph and all switches of the system define the second part of the bigraph, such as shown by way of example in FIGS. 3A-3B. This variation can enable one-hop communication between any two processors of the system: first, from a source processor to any switch of the system, and then from that switch to the destination processor. However, this variation may require a large number of waveguide crossings (e.g., crossings with other waveguides, crossings with electronics modules and/or other components, etc.), which may result in significant optical losses (in some photonics platforms). In some examples, it may be desirable to employ waveguide crossing structures that minimize such per-crossing optical losses. However, it may additionally or alternatively be beneficial to reduce the number of crossings, such as by including only a subset of the connections required to define a complete bigraph.

Accordingly, in a second variation, the processor topology may define any other suitable one-hop network (i.e., network in which each processor is coupled to every other processor by at least one switch). Thus, one-hop communication between any two processors of the system can be achieved with this variation as well: first, from a source processor to a switch that is connected to both the source and destination processors, and then from that switch to the destination processor.

Figure 4:
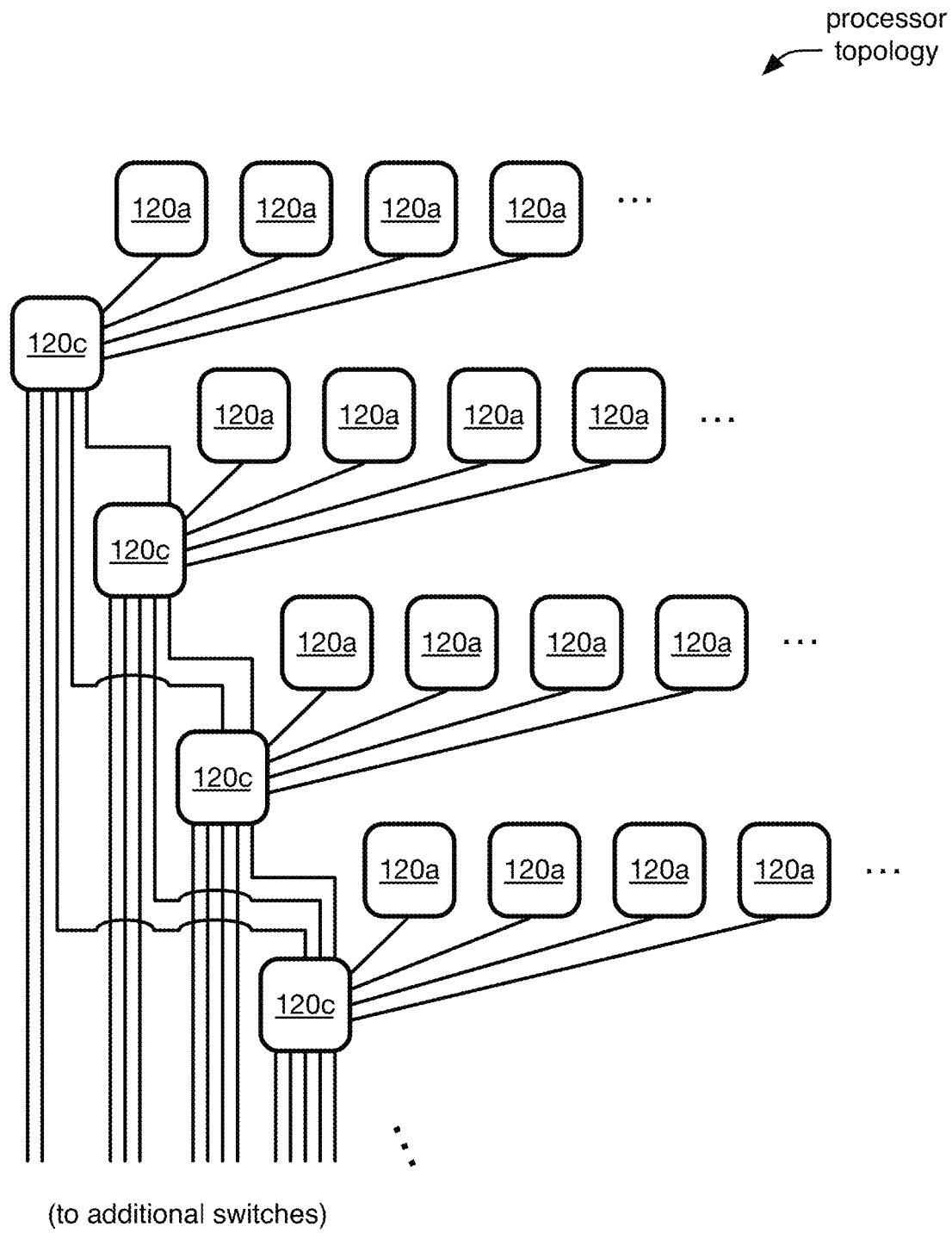
FIG. 4 is a schematic representation of a second variation of a switched processor topology.

In a third variation, the processor topology includes one connection to a switch for each processor, such as shown by way of example in FIG. 4. In this variation, the set of processors of the system can be partitioned into disjoint subsets, each subset connected to a different switch of the system. For example, for each switch, the system can include the associated subset of processors connected to the arranged proximal each other (e.g., and proximal the switch), preferably wherein the processors (e.g., and the switch) are arranged in a line (e.g., a row). In some examples, all such lines of the system are preferably arranged substantially parallel one another, but can alternatively have any other suitable arrangement relative to one another. In this variation, the switches can be connected to one or more other switches of the system. For example, the connected switches can be arranged proximal each other. For example, all switches of the system (or a subset of such switches) can be arranged in a line (e.g., a column), preferably arranged perpendicular or substantially perpendicular to the lines of processors. Each switch can be connected to all other switches of the system, to a set of nearest neighboring switches of the system, such as the n nearest neighbors for some small integer n (e.g., 1, 2, 3, 4, 6, 8, 10, 16, 5-10, 10-20, etc.), and/or connected to any other suitable switches of the system.

In this variation, communications between processors may require one, two, or more hops (depending on the connectivity of the switches). A source processor can send a communication to the switch to which it is connected. If the destination processor is in the same subset, then that switch can immediately send the communication to the destination processor. However, if the destination processor is connected to a different switch, then one or more switch-to-switch hops will be required. If the source and destination switch are directly connected, then the communication can be relayed with a total of two hops (one switch-to-switch hop). However, if the switches are not directly connected, additional switch-to-switch hops may be required to reach the destination switch before it can send the communication to the destination processor. Accordingly, some additional bandwidth limitations may arise in this variation, as it relies on a switch-to-switch communication trunk for many communications between the different processors.

However, the switched architecture can additionally or alternatively define any other suitable processor topology.

In some variations, the memory topology includes one switch connection for each memory controller (e.g., analogous to the second variation of the processor topology described above), such as shown by way of example in FIG. 3B. In such variations, the set of memory controllers is partitioned into disjoint subsets, each subset connected to a single switch. When coupled with a bigraph processor topology, this memory topology can enable one-hop communications between any processor and any memory controller, such as wherein the communication can go from the memory controller to the switch to which it is connected, and then from that switch to any desired processor, or vice versa (from processor to memory controller via the switch). However, the switched architecture can additionally or alternatively include any other suitable memory topology.

Figure 5A:
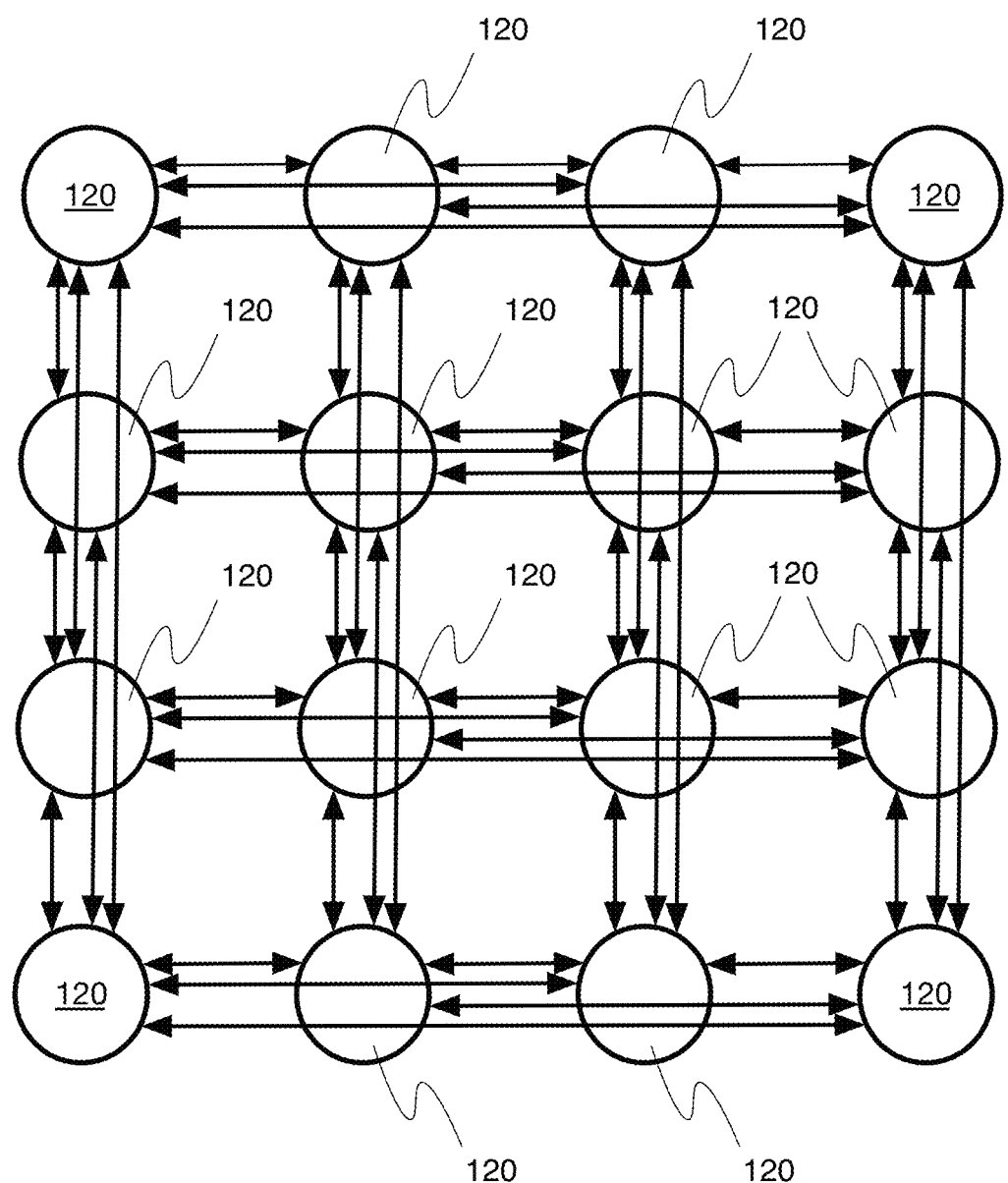
FIGS. 5A-5F are schematic representations of various examples of an unswitched network topology.
Figure 5B:
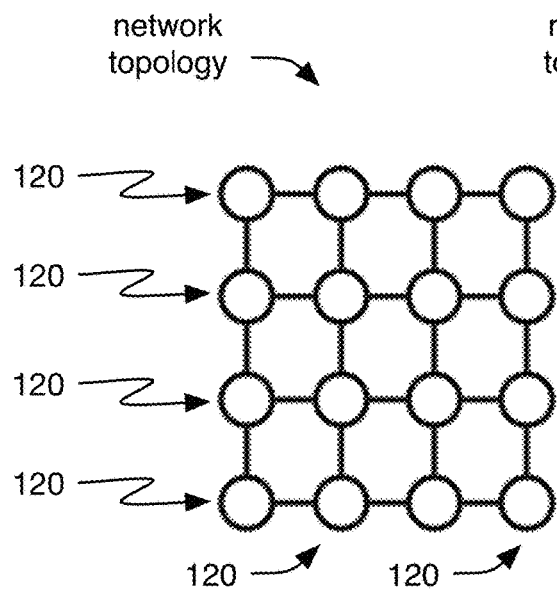
Figure 5C:
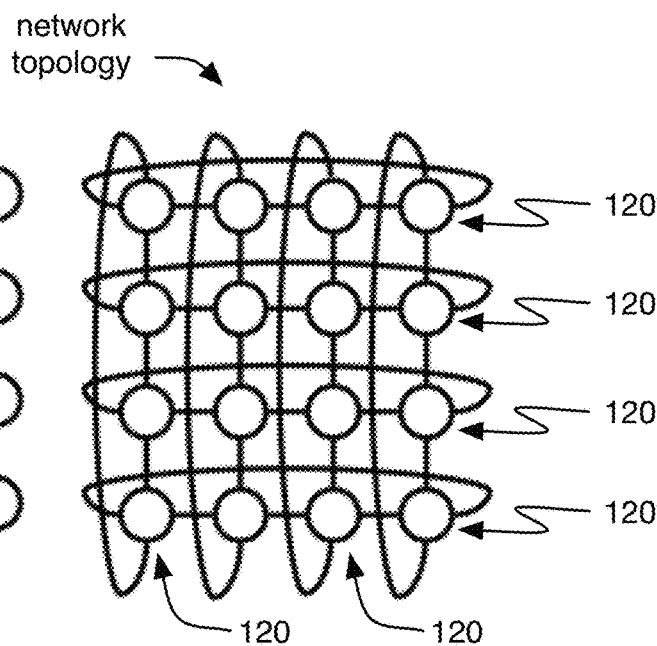
Figure 5D:
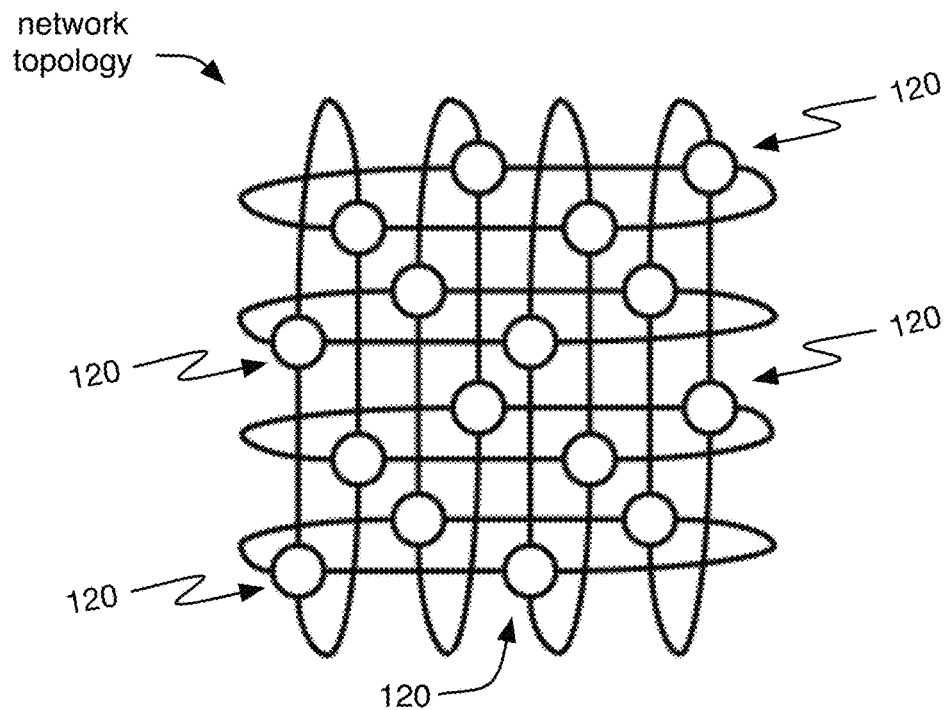
Figure 5E:
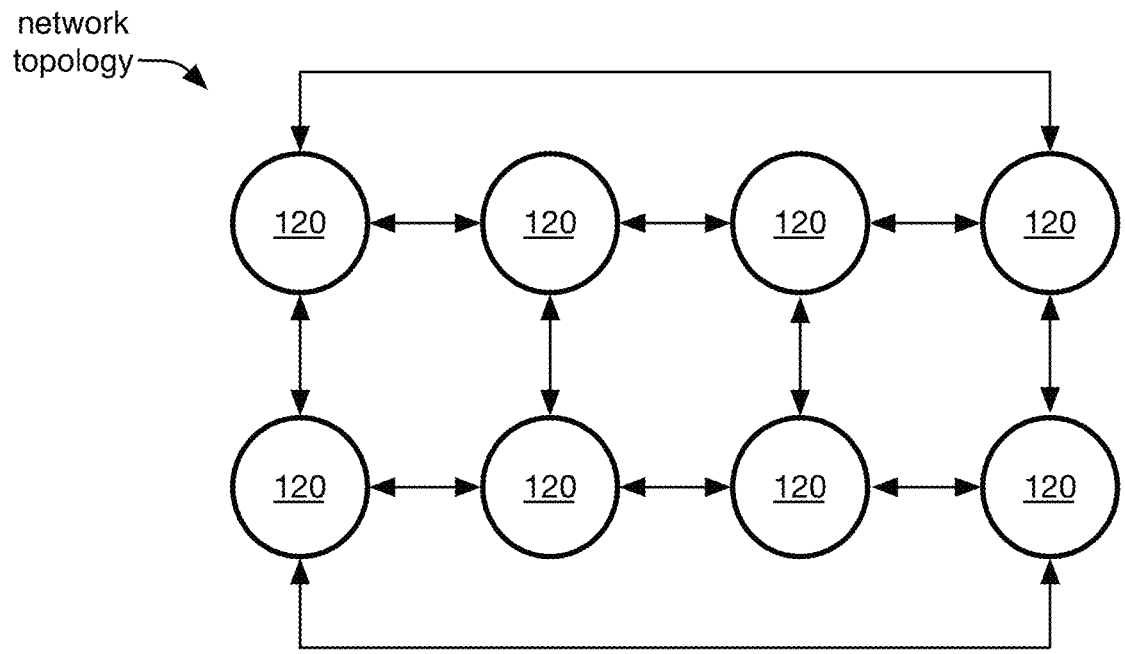
Figure 5F:
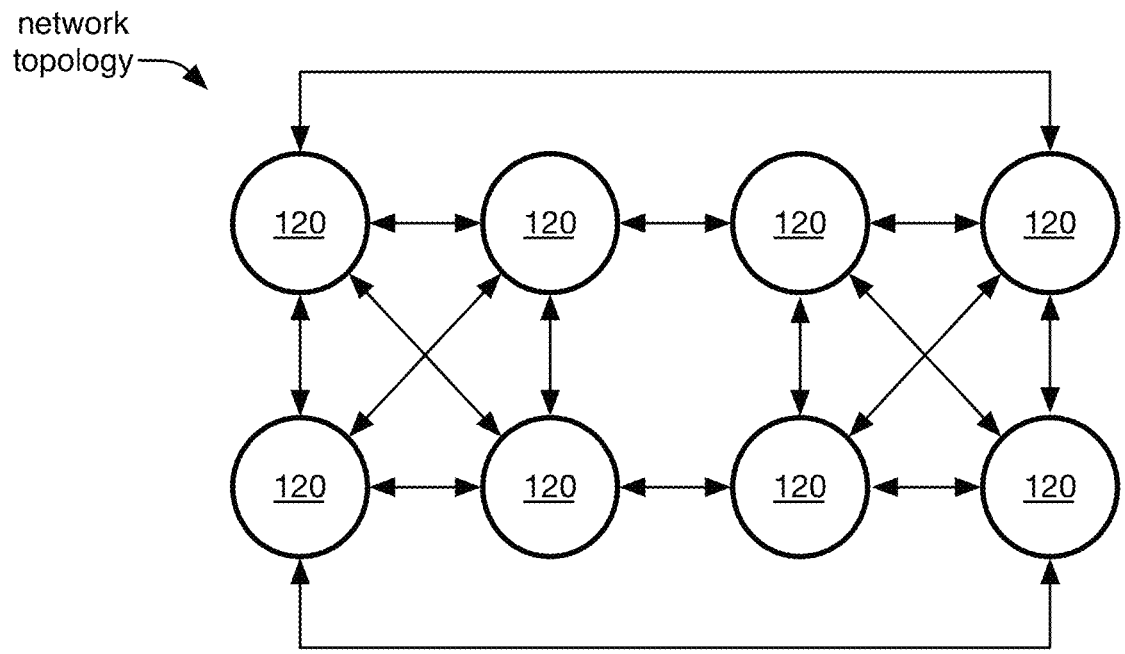

In a second embodiment, the system defines an unswitched architecture (e.g., broadcast architecture), in which all (or substantially all, most, etc.) switching, packet routing, and/or packet forwarding is performed within one or more processors, rather than being performed by separate switch modules 120c (e.g., separate switch chips and/or chiplets). In a first variation, the architecture defines a row/column mesh (e.g., as shown in FIG. 5A), in which each electronics module is directly connected to every other electronics module in its row and in its column. In a second variation, the architecture defines a nearest-neighbor mesh (e.g., as shown in FIG. 5B), in which each electronics module is directly connected only to its nearest neighbors in the array. In a third variation, the architecture defines a toroidal mesh, such as a standard toroidal mesh (e.g., as shown in FIG. 5C) or folded toroidal mesh (e.g., as shown in FIG. 5D). The toroidal mesh topologies can be favorable for some collective operations, such as ring reduce (e.g., ring All-Reduce) operations. In a fourth variation, the architecture defines a hypercube topology (e.g., as shown in FIG. 5E), optionally including some crossing connections (e.g., as shown in FIG. 5F), which is typically highly efficient with respect to both latency and bandwidth requirements, each of which can scale proportional to log(N) for a topology with N nodes. Although depicted herein on a rectangular array, the electronics modules of the unswitched architecture (or a subset thereof) can additionally or alternatively define any other suitable arrays (e.g., hexagonal array) and/or other arrangements. For example, the electronics modules can define a hexagonal array, in which each module is a member of three different rows (each parallel to a different axis of a hexagonal coordinate system); in a specific example, each module can be directly connected to every other module of each of these three rows, as a hexagonal analog to the first variation described above. However, the system can additionally or alternatively define any other suitable unswitched architecture.

In alternate embodiments, the system may include switches, but also include some direct connections between non-switch electronics modules (e.g., processor-processor connections, processor-memory controller connections, memory controller-memory controller connections, etc.).

However, the system can additionally or alternatively define any other suitable network topology, and/or the elements of the system can additionally or alternatively have any other suitable arrangements.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. An optical link system, comprising:
a photonics substrate;
a plurality of optical links, each optical link of the plurality comprising:
an optical waveguide defined on the photonics substrate;
a first optoelectronic transducer optically coupled to the optical waveguide; and
a second optoelectronic transducer optically coupled to the optical waveguide;
a set of at least one electronic switch module, each electronic switch module of the set comprising a packet-switching router; and
a plurality of processing modules distinct from the set of at least one electronic switch module, the plurality of processing modules comprising a plurality of electronics substrates, each processing module of the plurality of processing modules comprising:
a different electronics substrate of the plurality of electronics substrates bonded to the photonics substrate; and
a processor integrated circuit (IC) defined on the electronics substrate, the processor IC communicatively connected to an electronic switch module of the set of at least one electronic switch module via a respective optical link of the plurality of optical links, wherein the first optoelectronic transducer of the respective optical link is connected to the processor IC and the second optoelectronic transducer of the respective optical link is connected to the electronic switch module;
wherein the plurality of optical links and the set of at least one electronic switch module communicatively couple each processing module of the plurality of processing modules to every other processing module of the plurality of processing modules.

2. The system of claim 1, wherein a first optical link of the plurality of optical links communicatively connects a first processing module of the plurality of processing modules to a first electronic switch module of the set of at least one electronic switch module, wherein the first optical link is configured to:
at the first optoelectronic transducer:
receive an electronic input signal from the first electronic switch module;
transduce the electronic input signal into an optical signal; and
propagate the optical signal along the optical waveguide; and
at the second optoelectronic transducer:
receive the optical signal;
transduce the optical signal into an electronic output signal; and
provide the electronic output signal to the first processing module.

3. The system of claim 2, wherein the electronic output signal is identical to the electronic input signal.

4. The system of claim 1, wherein:
the plurality of optical links comprises a first optical link and a second optical link;
the plurality of processing modules comprises a first processing module and a second processing module;
the first optical link communicatively connects the first processing module to a first electronic switch module of the set of at least one electronic switch module;

the second optical link communicatively connects the first electronic switch module to the second processing module; and the system is configured to:
- at the first processing module: perform a first computation, generate a first electronic signal based on the first computation, and provide the first electronic signal to the first optoelectronic transducer of the first optical link;
- at the first optoelectronic transducer of the first optical link: receive the first electronic signal from the first processing module, transduce the first electronic signal into a first optical signal, and propagate the first optical signal along the optical waveguide of the first optical link to the second optoelectronic transducer of the first optical link;
- at the second optoelectronic transducer of the first optical link: receive the first optical signal, transduce the first optical signal into a second electronic signal, and provide the second electronic signal to the first electronic switch module;
- at the first electronic switch module: receive the second electronic signal and route it to the second processing module, comprising providing the second electronic signal to the first optoelectronic transducer of the second optical link;
- at the first optoelectronic transducer of the second optical link: receive the second electronic signal from the first electronic switch module, transduce the second electronic signal into a second optical signal, and propagate the second optical signal along the optical waveguide of the second optical link to the second optoelectronic transducer of the second optical link;
- at the second optoelectronic transducer of the second optical link: receive the second optical signal, transduce the second optical signal into a third electronic signal, and provide the third electronic signal to the second processing module; and
- at the second processing module: perform a second computation based on the third electronic signal.

5. The system of claim 1, wherein a first electronic switch module of the set of at least one electronic switch module further comprises a switch substrate bonded to the photonics substrate, wherein the packet-switching router comprises a switch IC defined on the switch substrate.

6. The system of claim 1, wherein the plurality of optical links comprises a first optical link, wherein the first optoelectronic transducer of the first optical link is defined on the photonics substrate.

7. The system of claim 1, wherein:
- a first optical link of the plurality of optical links communicatively connects a first processing module of the plurality of processing modules to a first electronic switch module of the set of at least one electronic switch module; and
- the first optoelectronic transducer of the first optical link is defined on the electronics substrate of the first processing module.

8. The system of claim 7, wherein the first optical link further comprises a grating coupler configured to couple light between the first optoelectronic transducer and the optical waveguide.

9. The system of claim 1, wherein the set of at least one electronic switch module comprises a plurality of electronic switch modules.

10. The system of claim 9, wherein each processor IC is communicatively coupled to each electronic switch module of the set of at least one electronic switch module via a separate optical link of the plurality of optical links.

11. The system of claim 10, wherein the plurality of electronic switch modules comprises a first electronic switch module and a second electronic switch module, wherein the system further comprises:
- a first memory module communicatively connected to the first electronic switch module via a first optical link of the plurality; and
- a second memory module communicatively connected to the second electronic switch module via a second optical link of the plurality.

12. The system of claim 1, wherein the set of at least one electronic switch module consists of a single electronic switch module.

13. The system of claim 1, further comprising a plurality of memory modules, each memory module of the plurality of memory modules communicatively connected to at least one electronic switch module of the set of at least one electronic switch module.

14. The optical link system of claim 1, wherein, for each processing module of the plurality of processing modules, the processor IC comprises a matrix multiplication core.

* * * * *